US012778144B2

(12) United States Patent
Zhang

(10) Patent No.: US 12,778,144 B2
(45) Date of Patent: Nov. 3, 2026

(54) DOUGH PRESSING MACHINE

(71) Applicant: Shenzhen Saileisi Technology Co., Ltd., Shenzhen (CN)

(72) Inventor: Shengxin Zhang, Shenzhen (CN)

(73) Assignee: SHENZHEN SAILEISI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 19/324,871

(22) Filed: Sep. 10, 2025

(65) Prior Publication Data

US 2026/0223865 A1 Aug. 6, 2026

(30) Foreign Application Priority Data

Feb. 6, 2025 (CN) ........................ 202520190433.1

(51) Int. Cl.
*A21C 11/10* (2006.01)

(52) U.S. Cl.
CPC .................................. *A21C 11/106* (2013.01)

(58) Field of Classification Search
None
See application file for complete search history.

(56) References Cited

U.S. PATENT DOCUMENTS 1,875,277 A * 8/1932 Sweeney ................ A21B 3/132 426/94
2,138,247 A * 11/1938 Tatosian ................. A21B 5/023 426/283
2,232,633 A * 2/1941 Richardson ............ A21C 9/068 425/293
2,249,667 A * 7/1941 Richardson .......... A21C 11/006 425/346

(Continued)

FOREIGN PATENT DOCUMENTS

CN 220777225 U 4/2024

*Primary Examiner* — Thor S Campbell
(74) *Attorney, Agent, or Firm* — Law Offices of Konrad Sherinian LLC; Depeng Bi

(57) ABSTRACT

Disclosed is a dough pressing machine, including an upper cover, a rotating shaft, a lower cover, and an edge pressing structure; the upper cover is rotatably connected to the lower cover via the rotating shaft, the upper cover is capable of rotating relative to the lower cover to cover the lower cover to form a dough pressing chamber; the edge pressing structure is disposed within the dough pressing chamber and includes a first edge-pressing structure and a second edge-pressing structure, the first edge-pressing structure and the second edge-pressing structure are disposed at an interval, and the second edge-pressing structure is detachably mounted on the upper cover and/or the lower cover. According to the dough pressing machine of the present disclosure, the second edge-pressing structure is detachably mounted on the upper cover and/or the lower cover. When the dough pressing machine is used by users, the second edge-pressing structure can be mounted and used for edge pressing, and when the second edge-pressing structure is removed, the first edge-pressing structure can be used for edge pressing. Different sizes of dough can thus be pressed; hence, the dough pressing machine is suitable for consumers with different appetites.

20 Claims, 2 Drawing Sheets

(56) References Cited

U.S. PATENT DOCUMENTS

| | | | | | |
|---|---|---|---|---|---|
| 2,463,439 | A | * | 3/1949 | Strietelmeier | A47J 37/0611 99/380 |
| 2,582,692 | A | * | 1/1952 | Funke | A47J 37/0611 99/383 |
| 2,780,163 | A | * | 2/1957 | Lee | A21B 3/13 D7/672 |
| 4,155,691 | A | | 5/1979 | Ridgeway et al. | |
| 4,163,418 | A | * | 8/1979 | Thelander | A47J 37/0611 99/380 |
| D262,425 | S | * | 12/1981 | Thelander | D7/357 |
| 4,363,614 | A | * | 12/1982 | Zaremba | A21C 11/106 425/383 |
| 4,516,923 | A | * | 5/1985 | Lifshitz | A21C 9/066 425/383 |
| 4,759,706 | A | * | 7/1988 | Damianakos | A47J 43/20 249/170 |
| D312,187 | S | * | 11/1990 | Khubani | D7/674 |
| 5,149,594 | A | | 9/1992 | Lewandowski et al. | |
| 5,613,426 | A | * | 3/1997 | Chan Gabbai | A47J 37/0611 99/383 |
| 6,035,767 | A | * | 3/2000 | Gibson | A47J 37/12 99/413 |
| 6,230,613 | B1 | * | 5/2001 | Porcari | A21C 9/066 99/450.2 |
| 6,508,166 | B1 | * | 1/2003 | Hennessey | A47J 43/283 99/426 |
| D479,944 | S | * | 9/2003 | Hennessey | D7/352 |
| D643,243 | S | * | 8/2011 | Harrod | D7/352 |
| D663,590 | S | * | 7/2012 | Muspratt-Williams | D7/674 |
| D679,137 | S | * | 4/2013 | Valera | D7/409 |
| D682,008 | S | * | 5/2013 | Shahani | D7/354 |
| D686,446 | S | * | 7/2013 | Valera | D7/352 |
| 11,412,742 | B2 | * | 8/2022 | Franklin | A21C 9/068 |
| D996,922 | S | * | 8/2023 | Ou | D7/674 |
| D1,017,342 | S | * | 3/2024 | Yang | D7/672 |
| D1,062,397 | S | * | 2/2025 | Li | D7/672 |
| 2003/0196561 | A1 | * | 10/2003 | Bart | A47J 37/10 99/422 |
| 2009/0061063 | A1 | | 3/2009 | Takeo et al. | |

* cited by examiner

DOUGH PRESSING MACHINE

TECHNICAL FIELD

The present disclosure relates to the field of molds, in particular to a dough pressing machine.

BACKGROUND

Flat-bread is very common in people's lives. A large piece of dough can be pressed into lots of small pieces of dough with fixed shapes, which speeds up the production of small flat-breads for vendors, and ensures neatness, cleanliness, and aesthetics. However, the dough pressing machine in the prior art usually produces small pieces of dough in a uniform size; hence, buyers cannot purchase different sizes of flat-breads according to their individual appetite needs, thereby resulting in food waste or insufficient quantity and leading to poor user's purchase experience.

SUMMARY

The present disclosure aims to provide a dough pressing machine to solve the problem, i.e., a conventional dough pressing machine produces small pieces of dough in a uniform size, hence, buyers cannot purchase different sizes of flat-breads according to their individual appetite needs, thereby resulting in food waste or insufficient quantity and leading to poor user's purchase experience.

To solve the above technical problem, the present disclosure adopts the following technical solution:

A dough pressing machine, including an upper cover, a rotating shaft, a lower cover, and an edge pressing structure; the upper cover is rotatably connected to the lower cover via the rotating shaft, the upper cover is capable of rotating relative to the lower cover to cover on the lower cover to form a dough pressing chamber, the edge pressing structure is disposed within the dough pressing chamber and includes a first edge-pressing structure and a second edge-pressing structure, the first-edge pressing structure and the second edge-pressing structure are disposed at an interval, and the second edge-pressing structure is detachably mounted on the upper cover and/or the lower cover.

In one embodiment, the edge pressing structure further includes a third edge-pressing structure, and the third edge-pressing structure and the second edge-pressing structure are disposed at an interval.

In one embodiment, the third edge-pressing structure is detachably mounted on the upper cover and/or the lower cover.

In one embodiment, the edge pressing structure is a serrated structure including a first tooth portion disposed on the upper cover and a second tooth portion disposed on the lower cover, and when the upper cover covers on the lower cover, the first tooth portion and the second tooth portion are meshed with each other.

In one embodiment, the edge pressing structure is extended circumferentially along the dough pressing machine, and the serrated structure is extended circumferentially and continuously along the edge pressing structure.

In one embodiment, the first edge-pressing structure, the second-edge pressing structure, and the third edge-pressing structure each include a first block and a second block, one side of the first block close to the second block is a first step structure, one side of the second block close to the first block is a second step structure, and the first block and the second block are disposed in a cooperation manner; the first step structure includes a first tabletop and a second tabletop, the second step structure includes a third tabletop and a fourth tabletop, and when the upper cover covers on the lower cover, the first tabletop is abutted against the third tabletop, and the second tabletop is abutted against the fourth tabletop.

In one embodiment, in the second edge-pressing structure and the third edge-pressing structure, one of the first block and the upper cover is provided with a mounting block, and the other is provided with a mounting groove, the mounting block is capable of being accommodated within the mounting groove such that the first block is detachably mounted on the upper cover; and one of the second block and the lower cover is provided with a mounting block, and the other is provided with a mounting groove, the mounting block is capable of being accommodated within the mounting groove such that the second block is detachably mounted on the lower cover.

In one embodiment, the upper cover is provided with a first rotating portion, the lower cover is provided with a second rotating portion, the first rotating portion and the second rotating portion are disposed on the same side of the upper cover and the lower cover, one of the first rotating portion and the second rotating portion is provided with a hanger, and the other is provided with a hanging hole, the hanger is clamped with the hanging hole, and the hanger is capable of rotating within the hanging hole such that the upper cover is capable of rotating relative to the lower cover.

In one embodiment, a control portion is disposed on one side of the upper cover away from the first rotating portion for manual operation to rotate and open the upper cover.

In one embodiment, the control portion is provided with a through hole for hanging the dough pressing machine.

According to the above technical solution, the embodiments of the present disclosure at least have the following advantages and positive effects:

The dough pressing machine in the embodiment of the present disclosure includes an upper cover, a rotating shaft, a lower cover, and an edge pressing structure, the edge pressing structure includes a first edge-pressing structure and a second edge-pressing structure, the second edge-pressing structure is detachably mounted on the upper cover and/or the lower cover. When the dough pressing machine is used by users, the second edge-pressing structure can be mounted and used for edge pressing, and when the second edge-pressing structure is removed, the first edge-pressing structure can be used for edge pressing. Different sizes of dough can be pressed, which is thus suitable for consumers with different appetites.

BRIEF DESCRIPTION OF THE DRAWINGS

To illustrate the technical solutions in the embodiments of the present disclosure or the prior art more clearly, the accompanying drawings required for the description of the embodiments or the prior art will be briefly introduced as follows. Obviously, the accompanying drawings described below are merely some embodiments of the present disclosure. Moreover, those skilled in the art could further obtain other drawings based on the structures shown in these drawings without any inventive efforts.

Figure 1:
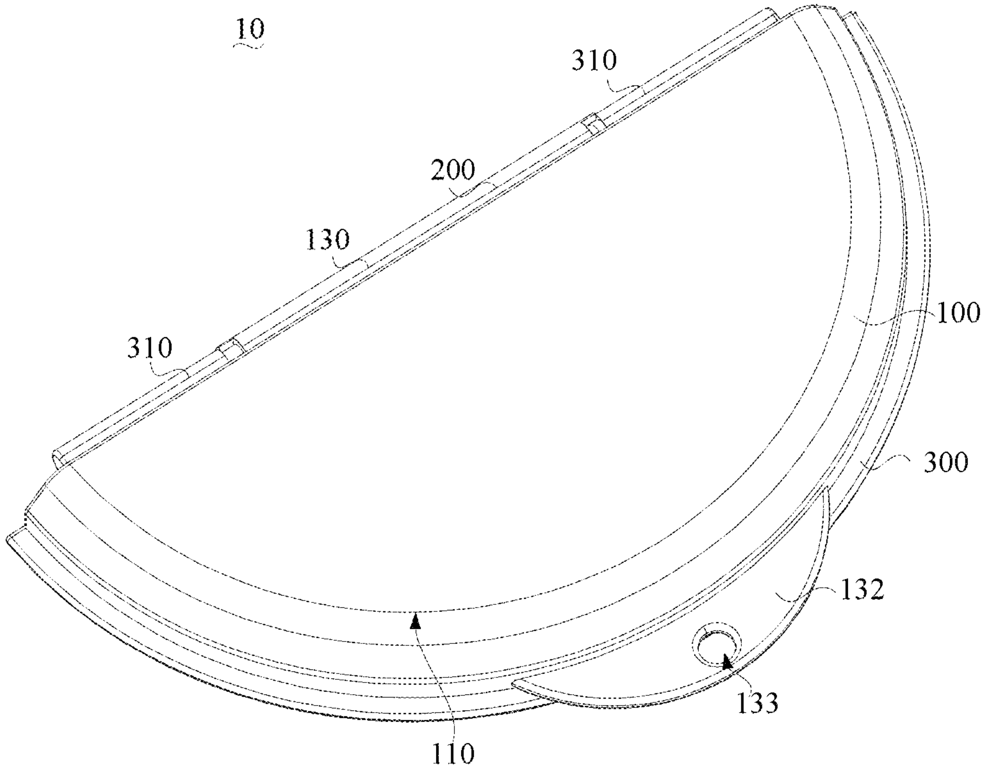
FIG. 1 is a schematic diagram showing an overall structure of a dough pressing machine according to an embodiment of the present disclosure.

Reference numerals are described as follows:

10, dough pressing machine; 100, upper cover; 110, dough pressing chamber; 120, mounting groove; 130, first rotating portion; 131, hanging hole; 132, control portion; 133, through hole; 200, rotating shaft; 300, lower cover; 310, second rotating portion; 311, hanger; 400, edge pressing structure; 410, first edge-pressing structure; 420, second edge-pressing structure; 421, first block; 422, second block; 423, first step structure; 424, second step structure; 425, first tabletop; 426, second tabletop; 427, third tabletop; 428, fourth tabletop; 429, mounting block; 430, third edge-pressing structure; 440, serrated structure; 441, first tooth portion; 442, second tooth portion.

DETAILED DESCRIPTION OF THE EMBODIMENTS

Typical embodiments embodying the features and advantages of the present disclosure will be described in detail in the following description. It should be understood that the present disclosure may be subject to various changes in different embodiments, all of which fall within the scope of the present disclosure, and the description and illustrations herein are essentially for explanatory purposes but shall be not construed as limiting the present disclosure.

Furthermore, the terms "first" and "second" are only for descriptive purposes and shall not be construed as indicating or implying relative importance or implying the number of technical features indicated. Accordingly, features defined as "first" or "second" may expressly or implicitly include one or more of the features. In the description of the present application, the term "a plurality of" means two or more, unless otherwise specified expressly and specifically.

In the description of the present application, it should be noted that unless otherwise specified and defined expressly, the terms "dispose", "connect", and "couple" should be understood in a broad sense. For example, it may be a fixed connection, a detachable connection, or an integral connection; it may be a mechanical connection or an electrical connection; it may be a direct connection or an indirect connection via an intermediary; or it may be an internal communication between two components. Those skilled in the art may understand the specific meanings of the above terms in the present application according to specific circumstances.

Please referring to FIG. 1 first, the present disclosure provides a dough pressing machine 10 for pressing different sizes of dough pieces. Users can press a dough into different sizes of dough pieces according to their needs to meet different appetite needs of different crowds, thereby avoiding food waste or insufficient quantity.

Figure 2:
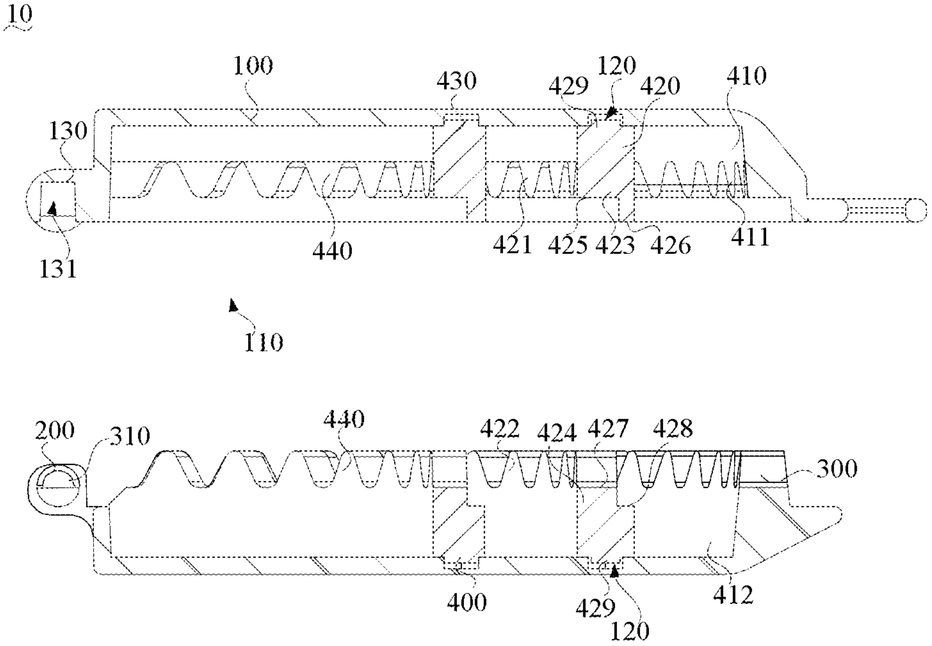
FIG. 2 is a schematic diagram showing a sectional structure of the dough pressing machine as shown in FIG. 1.

Referring to FIGS. 1 and 2, the dough pressing machine 10 includes an upper cover 100, a rotating shaft 200, and a lower cover 300. The upper cover 100 is rotatably connected to the lower cover 300 via the rotating shaft 200, and the upper cover 100 is capable of rotating relative to the lower cover 300 to cover on the lower cover 300, thereby forming a dough pressing chamber 110. The lower cover 300 is configured for placement on a tabletop, convenient for consumer use.

It should be noted that an anti-slip layer is disposed on one side of the lower cover 300 away from the upper cover 100, and is configured to increase a frictional force between the lower cover 300 and the table surface, such that the dough pressing machine 10 is free of moving relative to the tabletop when in use. It can be understood that the anti-slip layer may also not be configured as long as the dough pressing machine 10 may be placed on the tabletop, such solutions should be protected.

Referring to FIG. 2, the dough pressing machine 10 further includes an edge pressing structure 400 disposed inside the dough pressing chamber 110. The edge pressing structure 400 may press a large piece of dough placed inside the pressing chamber 110 into small pieces of dough with the same shape and size as the edge pressing structure 400.

Figure 3:
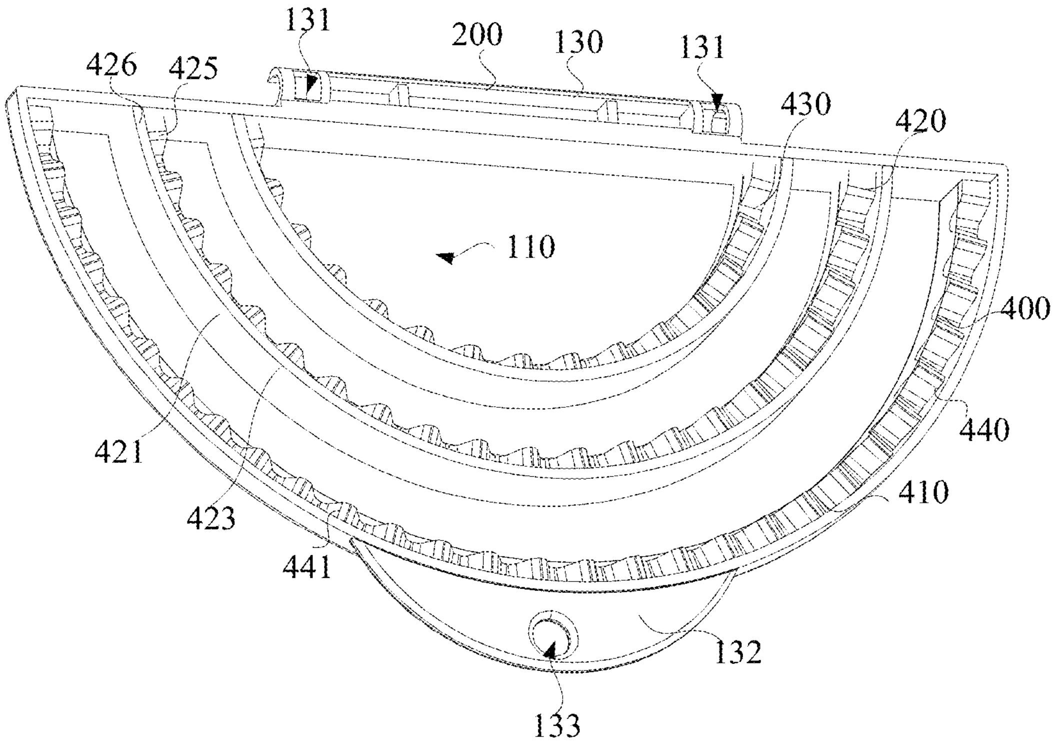
FIG. 3 is a structure diagram showing an upper cover of the dough pressing machine as shown in FIG. 1.
Figure 4:
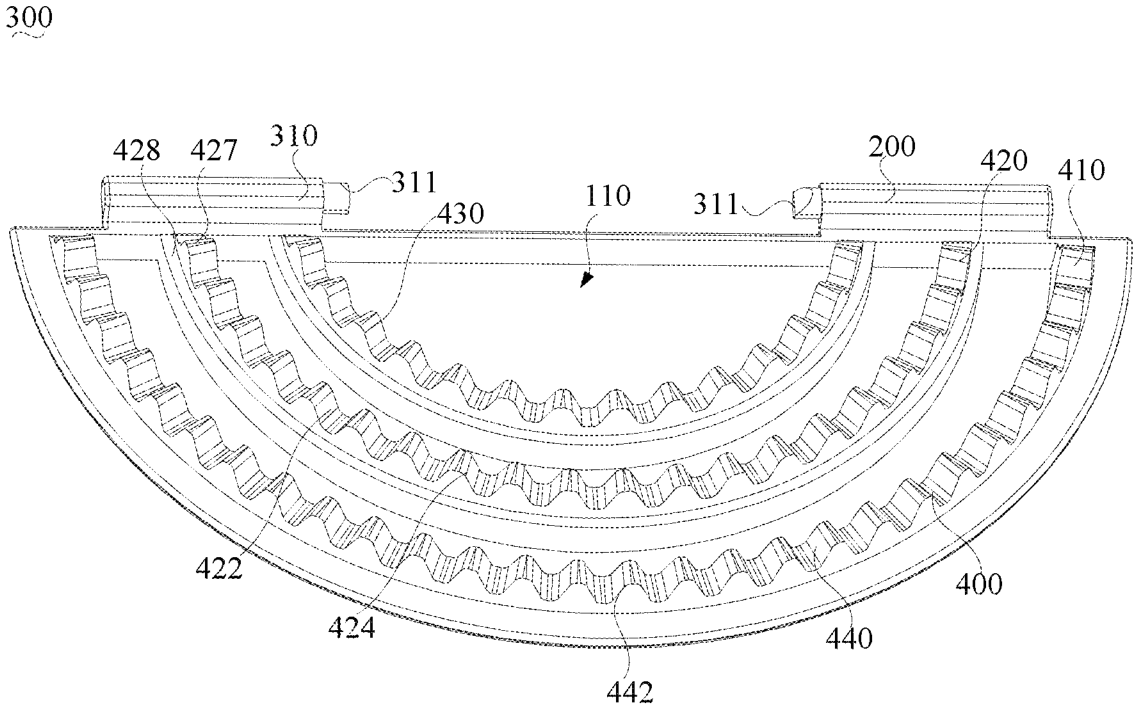
FIG. 4 is a structure diagram showing a lower cover of the dough pressing machine as shown in FIG. 1.

Referring to FIGS. 3 and 4, it should be noted that the edge pressing structure 400 includes a first edge-pressing structure 410 and a second edge-pressing structure 420 that are disposed at an interval. The first edge-pressing structure 410 is disposed at an edge of the pressing chamber 110, and the small pieces of dough pressed by the first edge-pressing structure 410 are of the same size as the pressing chamber 110; the second edge-pressing structure 420 is disposed within the dough pressing chamber 110, and the small pieces of dough pressed by the second edge-pressing structure 420 are smaller than those pressed by the first edge-pressing structure 410 in size.

It should be noted that, in this embodiment, the second edge-pressing structure 420 is detachably connected to the upper cover 100 and the lower cover 300.

It should be noted that, in other embodiments, the second edge-pressing structure 420 is detachably connected to the upper cover 100.

It should be noted that, in other embodiments, the second edge-pressing structure 420 is detachably connected to the lower cover 300.

To sum up, in the present application, the dough pressing machine 10 includes an upper cover 100, a rotating shaft 200, a lower cover 300, and an edge pressing structure 400. The edge pressing structure 400 includes a first edge-pressing structure 410 and a second edge-pressing structure 420, and the second edge-pressing structure 420 is detachably mounted on the upper cover 100 and/or the lower cover 300. When the dough pressing machine 10 is used by users, the second edge-pressing structure 420 can be mounted and used for edge pressing, and when the second edge-pressing structure 420 is removed, the first edge-pressing structure 410 can be used for edge pressing. Different sizes of dough may be pressed, which is thus suitable for consumers with different appetites.

Referring to FIGS. 3 and 4, the edge pressing structure 400 further includes a third edge-pressing structure 430 disposed within the dough pressing chamber 110. The third edge-pressing structure 430 and the second edge-pressing structure 420 are disposed at an interval, and the small pieces of dough pressed by the third edge-pressing structure 430 are smaller than those pressed by the first edge-pressing structure 410 and the second edge-pressing structure 420 in size. The third edge-pressing structure 430 is disposed to increase user's choices, and the dough pressing machine 10 may press more sizes of small pieces of dough and thus, is suitable for more users with different appetites. It may be understood that, without considering the need for the dough pressing machine 10 to accommodate more users with different appetites, the third edge-pressing structure 430 may also not be configured, as long as the dough pressing machine 10 is provided with the edge pressing structure 400, such solutions should be protected.

It should be noted that, in this embodiment, the third edge-pressing structure 430 is detachably connected to the upper cover 100 and the lower cover 300.

It should be noted that, in other embodiments, the third edge-pressing structure 430 is detachably connected to the upper cover 100.

It should be noted that, in other embodiments, the third edge-pressing structure 430 is detachably connected to the lower cover 300.

Referring to FIGS. 3 and 4, the edge pressing structure 400 is a serrated structure 440 including a first tooth portion 441 disposed on the upper cover 100 and a second tooth portion 442 disposed on the lower cover 300. When the upper cover 100 covers on the lower cover 300, the first tooth portion 441 and the second tooth portion 442 are meshed with each other. The edge pressing structure 400 is configured as a serrated structure 440 by which a large piece of dough may be pressed into small pieces of dough better and more quickly, making it easier for users to press the dough. Furthermore, by configuring the first tooth portion 441 and the second tooth portion 442, when the large piece of dough is placed within the dough pressing chamber 110, and positioned between the upper cover 100 and the lower cover 300, the large piece of dough will be free of deformation due to pressing. It may be understood that, without considering the case of more effort saving and the possibility of deformation, the serrated structure 440 may also not be configured as long as the edge pressing structure 400 may press the large piece of dough into small pieces of dough, such solutions should be protected.

Referring to FIGS. 3 and 4, it should be noted that the edge pressing structure 400 is extended circumferentially along the dough pressing machine 10, and the serrated structure 440 is extended circumferentially and continuously along the edge pressing structure 400.

Referring to FIGS. 3 and 4, it should be noted that the first edge-pressing structure 410, the second edge-pressing structure 420, and the third edge-pressing structure 430 each include a first block 421 and a second block 422.

Referring to FIGS. 3 and 4, one side of the first block 421 close to the second block 422 is a first step structure 423, one side of the second block 422 close to the first block 421 is a second step structure 424, and the first block 421 and the second block 422 are disposed in a cooperation manner; referring to FIG. 2, the first step structure 423 includes a first tabletop 425 and a second tabletop 426, the second step structure 424 includes a third tabletop 427 and a fourth tabletop 428, and when the upper cover 100 covers on the lower cover 300, the first tabletop 425 is abutted against the third tabletop 427, and the second tabletop 426 is abutted against the fourth tabletop 428. By configuring the first step structure 423 and the second step structure 424, small pieces of dough may be pressed via the cooperation between the first tabletop 425 and the third tabletop 427, and may be also pressed via the cooperation between the second tabletop 426 and the fourth tabletop 428, thereby further ensuring that a large piece of dough may be pressed into small pieces of dough by the second edge-pressing structure 420. Meanwhile, after the dough pressing machine 10 is used for a period of time, abrasion will occur on the first tabletop 425 and the third tabletop 427 such that the second tabletop 426 and the fourth tabletop 428 are still able to continue pressing the dough when the first tabletop 425 and the third tabletop 427 may no longer press the dough, thereby extending the service life of the dough pressing machine 10. It is understood that the first step structure 423 and the second step structure 424 may also be not configured as long as small pieces of dough may be pressed via the second edge-pressing structure 420, such solutions should be protected.

Referring to FIG. 2, particularly, in the second edge-pressing structure 420 and the third edge-pressing structure 430, one of the first block 421 and the upper cover 100 is provided with a mounting block 429, and the other is provided with a mounting groove 120. For example, as shown in FIG. 2, the first block 421 is provided with a mounting block 429, the upper cover 100 is provided with a mounting groove 120, and the mounting block 429 is capable of being accommodated within the mounting groove 120 such that the first block 421 is detachably mounted on the upper cover 100. It should be noted that positions of the mounting block 429 and the mounting groove 120 may also be interchangeable, at this time, the mounting block 429 is disposed on the upper cover 100, and the mounting groove 120 is disposed on the first block 421. It is understood that the mounting block 429 and the mounting groove 120 may also be not configured as long as the first block 421 is detachably mounted on the upper cover 100, such solutions should be protected.

Referring to FIG. 2, one of the second block 422 and the lower cover 300 is provided with a mounting block 429, and the other is provided with a mounting groove 120. For example, as shown in FIG. 2, the second block 422 is provided with a mounting block 429, the lower cover 300 is provided with a mounting groove 120, and the mounting block 429 is capable of being accommodated within the mounting groove 120 such that the second block 422 is detachably mounted on the lower cover 300. It should be noted that positions of the mounting block 429 and the mounting groove 120 may also be interchangeable, at this time, the mounting block 429 is disposed on the lower cover 300, and the mounting groove 120 is disposed on the second block 422. It is understood that the mounting block 429 and the mounting groove 120 may also be not configured as long as the second block 422 is detachably mounted on the lower cover 300, such solutions should be protected.

Referring to FIGS. 3 and 4, the upper cover 100 is provided with a first rotating portion 130, and the lower cover 300 is provided with a second rotating portion 310. The first rotating portion 130 and the second rotating portion 310 are disposed on the same side of the upper cover 100 and the lower cover 300, and the first rotating portion 130 and the second rotating portion 310 together form the aforesaid rotating shaft 200.

Referring to FIGS. 3 and 4, one of the first rotating portion 130 and the second rotating portion 310 is provided with a hanger 311, and the other is provided with a hanging hole 131. For example, as shown in FIGS. 3 and 4, the first rotating portion 130 is provided with a hanging hole 131, and the second rotating portion 310 is provided with a hanger 311. The hanger 311 is clamped within the hanging hole 131, and the hanger 311 is capable of rotating within the hanging hole 131 such that the upper cover 100 is capable of rotating relative to the lower cover 300. It should be noted that positions of the hanger 311 and the hanging hole 131 may also be interchangeable, at this moment, the hanging hole 131 is disposed on the second rotating portion 310, and the hanger 311 is disposed on the first rotating portion 130. It is understood that the hanger 311 and the hanging hole 131 may also be not configured as long as the upper cover 100 is capable of rotating relative to the lower cover 300, such solutions should be protected.

Referring to FIGS. 1 and 3, it should be noted that one side of the upper cover 100 away from the first rotating portion 130 is provided with a control portion 132 for manual operation to rotate and open the upper cover 100. The control portion 132 is configured such that users may manipulate the control portion 132 to drive the upper cover 100 for rotation relative to the lower cover 300, thereby facilitating operation and simplifying use. It is understood that the control portion 132 may also be not configured as long as the upper cover 100 is capable of rotating relative to the lower cover 300, such solutions should be protected.

Referring to FIGS. 1 and 3, it should be noted that the control portion 132 is provided with a through hole 133 through which a user may thread a lanyard to hang the dough pressing machine 10. After the user uses the dough pressing machine 10, the user may hang up the dough pressing machine 10 to save space and increase storage space. It is understood that, without considering space saving, the through hole 133 may also be not configured as long as the upper cover 100 is provided with a control portion 132, such solutions should be protected.

When users need to use the dough pressing machine 10, the control portion 132 is operated such that the upper cover 100 rotates relative to the lower cover 300 to open the dough pressing chamber 110. At this time, a large piece of dough may be placed into the dough pressing chamber 110, then the control portion 132 is operated again to press into small pieces of dough.

Although the present disclosure has been described with reference to several exemplary embodiments, it should be understood that the terms used herein are merely for illustrative and exemplary purposes, but are not limited. Since the present disclosure may be embodied in various forms without departing from the spirit or essence of the present disclosure. Hence, it should be understood that the above embodiments are not limited to any of the foregoing details, but shall be interpreted broadly within the spirit and scope defined by the appended claims. Therefore, all the variations and modifications falling within the scope of the claims or equivalents thereof are intended to be covered by the appended claims.

What is claimed is:

1. A dough pressing machine, comprising an upper cover, a rotating shaft, a lower cover rotatably connected to the upper cover via the rotating shaft, and an edge pressing structure having a first edge-pressing structure and a second edge-pressing structure, wherein:

(1) the upper cover is adapted to rotate relative to the lower cover to cover the lower cover to form a dough pressing chamber enclosing the first edge-pressing structure and the second edge-pressing structure;

(2) the first edge-pressing structure and the second edge-pressing structure are disposed at an interval;

(3) the first edge-pressing structure encloses the second edge-pressing structure;

(4) each of the first and second edge-pressing structures includes a first block and a second block;

(5) the first block of the first edge-pressing structure is disposed on the upper cover; and (6) the second block of the first edge-pressing structure is disposed on the lower cover.

2. The dough pressing machine of claim 1, wherein:

(1) the first block of the first edge-pressing structure includes a first step structure;

(2) the second block of the first edge-pressing structure includes a second step structure;

(3) the first block of the second edge-pressing structure includes a first step structure;

(4) the second block of the second edge-pressing structure includes a second step structure;

(5) each of the first step structures includes a first step tabletop and a second step tabletop;

(6) each of the second step structures includes a first step tabletop and a second step tabletop;

(7) the first step tabletop of the first block of the first edge-pressing structure abuts the first step tabletop of the second block of the first edge-pressing structure when the upper cover is rotated to cover the lower cover to form the dough pressing chamber; and (8) the first step tabletop of the first block of the second edge-pressing structure abuts the first step tabletop of the second block of the second edge-pressing structure when the upper cover is rotated to cover the lower cover to form the dough pressing chamber.

3. The dough pressing machine according to claim 2, wherein;

(1) the first edge-pressing structure is a serrated structure with the first step tabletop of the first step structure of the first block of the first edge-pressing structure incorporating a first tooth structure and the first step tabletop of the second step structure of the second block of the first edge-pressing structure incorporating a second tooth structure;

(2) the first tooth structure of the first edge-pressing structure meshes with the second tooth structure of the first edge-pressing structure when the upper cover is rotated to cover the lower cover to form the dough pressing chamber;

(3) the second edge-pressing structure is a serrated structure with the first step tabletop of the first step structure of the first block of the second edge-pressing structure incorporating a first tooth structure and the first step tabletop of the second step structure of the second block of the second edge-pressing structure incorporating a second tooth structure; and (4) the first tooth structure of the first edge-pressing structure meshes with the second tooth structure of the first edge-pressing structure when the upper cover is rotated to cover the lower cover to form the dough pressing chamber.

4. The dough pressing machine of claim 3, wherein the first edge pressing structure extends circumferentially along the outer edge of the dough pressing machine.

5. The dough pressing machine of claim 4, wherein the first edge pressing structure and the second edge pressing structure are annular sectors in shape.

6. A dough pressing machine, comprising an upper cover, a rotating shaft, a lower cover, and an edge pressing structure, wherein:

(1) the upper cover is rotatably connected to the lower cover via the rotating shaft;

(2) the upper cover is capable of rotating relative to the lower cover to cover the lower cover to form a dough pressing chamber;

(3) the edge pressing structure is disposed within the dough pressing chamber and comprises a first edge-pressing structure and a second edge-pressing structure;

(4) the first-edge pressing structure and the second edge-pressing structure are disposed at an interval;

(5) the second edge-pressing structure is detachably mounted on the upper cover and/or the lower cover;

(6) the edge pressing structure further comprises a third edge-pressing structure;

(7) the third edge-pressing structure and the second edge-pressing structure are disposed at an interval;

(8) the third edge-pressing structure is detachably mounted on the upper cover and/or the lower cover;

(9) the first edge-pressing structure, the second-edge pressing structure, and the third edge-pressing structure each comprise a first block and a second block, one side of the first block close to the second block being a first step structure, one side of the second block close to the first block being a second step structure, and the first block and the second block being disposed in a cooperation manner; and

(10) the first step structure comprises a first tabletop and a second tabletop, wherein the second step structure comprises a third tabletop and a fourth tabletop, and when the upper cover covers the lower cover, the first tabletop is abutted against the third tabletop, and the second tabletop is abutted against the fourth tabletop.

7. The dough pressing machine according to of claim 6, wherein in the second edge-pressing structure and the third edge-pressing structure, one of the first block and the upper cover is provided with a mounting block, and the other is provided with a mounting groove, the mounting block is capable of being accommodated within the mounting groove such that the first block is detachably mounted on the upper cover; and one of the second block and the lower cover is provided with a mounting block, and the other is provided with a mounting groove, the mounting block is capable of being accommodated within the mounting groove such that the second block is detachably mounted on the lower cover.

8. The dough pressing machine of claim 3, wherein the first block of the second edge-pressing structure is detachably mounted on the upper cover via a mounting mechanism with a mounting block and a mounting groove, and the second block of the second edge-pressing structure is detachably mounted on the lower cover via a mounting mechanism with a mounting block and mounting groove.

9. The dough pressing machine of claim 8, wherein the upper cover is provided with a first rotating portion, the lower cover is provided with a second rotating portion, the first rotating portion and the second rotating portion disposed on the same side of the upper cover and the lower cover, one of the first rotating portion and the second rotating portion provided with a hanger and the other is provided with a hanging hole, the hanger clamped with the hanging hole, and the hanger adapted to rotate within the hanging hole such that the upper cover is capable of rotating relative to the lower cover.

10. The dough pressing machine of claim 9, wherein the control portion is disposed on one side of the upper cover away from the first rotating portion for manual operation to rotate and open the upper cover.

11. The dough pressing machine of claim 1, wherein the first block of the second edge-pressing structure is detachably mounted on the upper cover; and the second block of the second edge-pressing structure is detachably mounted on the lower cover.

12. The dough pressing machine of claim 2, wherein the first block of the second edge-pressing structure is detachably mounted on the upper cover; and the second block of the second edge-pressing structure is detachably mounted on the lower cover.

13. The dough pressing machine of claim 3, wherein the first block of the second edge-pressing structure is detachably mounted on the upper cover; and the second block of the second edge-pressing structure is detachably mounted on the lower cover.

14. The dough pressing machine of claim 5, wherein the first block of the second edge-pressing structure is detachably mounted on the upper cover; and the second block of the second edge-pressing structure is detachably mounted on the lower cover.

15. A dough pressing machine, comprising an upper cover, a rotating shaft, a lower cover rotatably connected to the upper cover via the rotating shaft, and an edge pressing structure having a first edge-pressing structure, a second edge-pressing structure and a third edge-pressing structure, wherein:

(1) the upper cover is adapted to rotate relative to the lower cover to cover the lower cover to form a dough pressing chamber enclosing the first edge-pressing structure, a second edge-pressing structure and a third edge-pressing structure;

(2) the first edge-pressing structure and the second edge-pressing structure are disposed at an interval;

(3) the second edge-pressing structure and the third edge-pressing structure are disposed at an interval;

(4) the first edge-pressing structure encloses the second edge-pressing structure;

(5) the second edge-pressing structure encloses the third edge-pressing structure;

(6) each of the first, second and third edge-pressing structures includes a first block and a second block; and (7) the first blocks of the first, second and third edge-pressing structures are disposed on the upper cover; and (8) the second blocks of the first, second and third edge-pressing structures are disposed on the lower cover.

16. The dough pressing machine of claim 15, wherein:

(1) the first block of the first edge-pressing structure includes a first step structure;

(2) the second block of the first edge-pressing structure includes a second step structure;

(3) the first block of the second edge-pressing structure includes a first step structure;

(4) the second block of the second edge-pressing structure includes a second step structure;

(5) the first block of the third edge-pressing structure includes a first step structure;

(6) the second block of the third edge-pressing structure includes a second step structure;

(7) each of the first step structures includes a first step tabletop and a second step tabletop;

(8) each of the second step structures includes a first step tabletop and a second step tabletop;

(9) the first step tabletop of the first block of the first edge-pressing structure abuts the first step tabletop of the second block of the first edge-pressing structure when the upper cover is rotated to cover the lower cover to form the dough pressing chamber;

(10) the first step tabletop of the first block of the second edge-pressing structure abuts the first step tabletop of the second block of the second edge-pressing structure when the upper cover is rotated to cover the lower cover to form the dough pressing chamber; and

(11) the first step tabletop of the first block of the third edge-pressing structure abuts the first step tabletop of the second block of the third edge-pressing structure when the upper cover is rotated to cover the lower cover to form the dough pressing chamber.

17. The dough pressing machine according to claim 16, wherein:

(1) the first edge-pressing structure is a serrated structure with the first step tabletop of the first step structure of the first block of the first edge-pressing structure incorporating a first tooth structure and the first step tabletop of the second step structure of the second block of the first edge-pressing structure incorporating a second tooth structure;

(2) the first tooth structure of the first edge-pressing structure meshes with the second tooth structure of the first edge-pressing structure when the upper cover is rotated to cover the lower cover to form the dough pressing chamber;

(3) the second edge-pressing structure is a serrated structure with the first step tabletop of the first step structure of the first block of the second edge-pressing structure incorporating a first tooth structure and the first step tabletop of the second step structure of the second block of the second edge-pressing structure incorporating a second tooth structure;

(4) the first tooth structure of the first edge-pressing structure meshes with the second tooth structure of the first edge-pressing structure when the upper cover is rotated to cover the lower cover to form the dough pressing chamber;

(5) the third edge-pressing structure is a serrated structure with the first step tabletop of the first step structure of the first block of the third edge-pressing structure incorporating a first tooth structure and the first step tabletop of the second step structure of the second block of the third edge-pressing structure incorporating a second tooth structure; and (6) the first tooth structure of the third edge-pressing structure meshes with the second tooth structure of the third edge-pressing structure when the upper cover is rotated to cover the lower cover to form the dough pressing chamber.

18. The dough pressing machine of claim 17, wherein the first edge pressing structure extends circumferentially along the outer edge of the dough pressing machine; and the first edge pressing structure, the second edge pressing structure and the third edge pressing structure are annular sectors in shape.

19. The dough pressing machine of claim 15, wherein:

(1) the first block of the second edge-pressing structure is detachably mounted on the upper cover;

(2) the second block of the second edge-pressing structure is detachably mounted on the lower cover;

(3) the first block of the third edge-pressing structure is detachably mounted on the upper cover; and (4) the second block of the third edge-pressing structure is detachably mounted on the lower cover.

20. The dough pressing machine of claim 17, wherein:

(1) the first block of the second edge-pressing structure is detachably mounted on the upper cover;

(2) the second block of the second edge-pressing structure is detachably mounted on the lower cover;

(3) the first block of the third edge-pressing structure is detachably mounted on the upper cover; and (4) the second block of the third edge-pressing structure is detachably mounted on the lower cover.

* * * * *